United States Patent
Blackwell et al.

(10) Patent No.: US 8,449,831 B2
(45) Date of Patent: May 28, 2013

(54) SPIN FORMED CATALYST

(75) Inventors: Bryan E. Blackwell, Franklin, IN (US);
Eric L. Reeck, Columbus, IN (US);
Howard S. Savage, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 889 days.

(21) Appl. No.: 12/178,812

(22) Filed: Jul. 24, 2008

(65) Prior Publication Data
US 2010/0021356 A1   Jan. 28, 2010

(51) Int. Cl.
*B01D 50/00* (2006.01)

(52) U.S. Cl.
USPC .......................................... 422/179; 422/180

(58) Field of Classification Search
USPC .......................................... 422/177, 179, 180
See application file for complete search history.

(56) References Cited

U.S. PATENT DOCUMENTS

| | | | | |
|---|---|---|---|---|
| 4,160,010 | A | * | 7/1979 | Ottle .............................. 422/180 |
| 2004/0025341 | A1 | * | 2/2004 | Li et al. ........................... 29/890 |
| 2004/0213708 | A1 | * | 10/2004 | Wagner et al. ................ 422/180 |

OTHER PUBLICATIONS

James F. Unruh, "Design of Durable Catalytic Converters from Mat Material Coupon Fragility Data, 18-9291." Southwest Research Institute. Obtained from http://www.swri.org/3pubs/IRD2002/18-9291.htm, prior to Jul. 24, 2008.
3M™ Interam® Overview. Obtained from http://solutions.3m.com/wps/portal/3M/en_US/Interam/Home/About/Overview prior to Jul. 24, 2008.

* cited by examiner

*Primary Examiner* — Tom Duong
(74) *Attorney, Agent, or Firm* — Hamre, Schumann, Mueller & Larson, P.C.

(57) ABSTRACT

A catalytic device and method for forming a catalytic device are described. The devices and methods described can be used for emissions systems in heavy duty diesel engines. In particular, a method of spin forming a catalytic device generally includes disposing a mat about an outer surface of a catalyst substrate and inserting the catalyst substrate and mat inside a shell. The mat is between the shell and the catalyst substrate. The shell, catalyst substrate, and mat can be spin formed into at least a generally elliptical shape but generally other than a circle shape.

9 Claims, 2 Drawing Sheets

SPIN FORMED CATALYST

FIELD

This disclosure relates to catalytic devices and methods for forming the same. Particularly, the disclosure relates to spin forming a catalytic device, where a mat is disposed between a shell of the catalyst device and its catalyst substrate.

BACKGROUND

Aftertreatment devices are well known and used for the aftertreatment of engine exhaust gases and materials in, for example, various internal combustion engine applications such as heavy duty diesel engines. Closed coupled catalysts, for example, are useful for handling and/or removing exhaust materials including carbon monoxide, unburned hydrocarbons, and soot present in the exhaust stream of an engine, and are useful for converting nitric oxide to nitrogen dioxide to enable passive regeneration of a diesel particulate filter or to enhance conversion in selective catalytic reduction systems.

In the example of closed coupled catalysts, current formation techniques include rolling a metal shell over a catalyst substrate. Joining a metallic closed coupled catalyst to the greater exhaust system also rely on formation of mechanical couplings such as flanges or weldments. Such techniques, however, can require extensive tooling which is proved to be less cost effective. For example, in addition to formation of the shell and catalyst substrate, current designs also need a plurality of components such as welded end cones to connect to the main shell and catalyst substrate, in order to satisfy multiple junctions. The resulting catalyst is overall costly and complicated to produce.

Due to original equipment manufacturer space constraints, the need to package catalyst substrates in smaller and sometimes unique spaces is increasing. Catalyst devices for example closed coupled catalysts, are being produced that are not always in the shape of a conventional circle. For example, other elliptical and other odd shapes that are not the shape of a circle are often desired.

As an alternative to the current rolling and joining techniques, spin formed metallic packages have been contemplated as another approach to manufacturing aftertreatment devices. In general, spin forming is known as a very flexible manufacturing method that minimizes tooling expense versus other traditional methods. Spin forming techniques typically employ discs or tubes of metal that are rotated at high speeds and are cold formed (i.e. at ambient temperature) into a die to shape an outside diameter or onto a mandrel to shape an inside diameter. Spin forming has been known to be useful in generally forming circle shaped components, but has not been suitably developed in the area of catalyst formation.

Unfortunately, current attempts to produce aftertreatment devices using spin forming techniques form the shell directly to the catalyst substrate. This formation technique results in, for example metal to metal contact between the shell and the mantle of the catalyst substrate, or perhaps metal to ceramic contact between the shell and the substrate. Such direct contact between the shell and the catalyst substrate can have a propensity to vibrate during extended operation either creating acute noise, vibration, and harshness (NVH) issues, or resulting in chronic failure of the overall device due to mechanical fatigue. Further, a viable joint between the inside of the shell and the outside of the catalyst substrate cannot consistently be achieved. As a result, leakage of exhaust gas and blowby around or past the catalyst substrate without being treated can lead to degradation of emissions performance. In examples where a ceramic catalyst substrate is employed, the use of spin forming the shell and the catalyst substrate in direct contact can also cause cracking of the catalyst substrate and render it unworkable. Catalyst washcoat spalling and loss of catalyst chemical performance can present further problems in such designs. These drawbacks are of particular concern for catalyst devices that are of an elliptical or other odd shape and that are not the shape of a circle. Where OEMs require catalyst devices with geometry that cannot be defined by a single parameter such as a radius, such current attempts are not practicable.

Ceramic mats have been used to seal various catalyst substrates in for example a diesel oxidation catalyst (DOC), diesel particulate filter (DPF), selective catalytic reduction (SCR) systems, $NO_x$ adsorber catalyst (NAC), partial filter and urea hydrolysis catalyst (UHC), and precious metals catalysts. These catalysts, however, do not undergo a spin forming process. Rather, these rigid elements are captured by sizing the compliant mat with the rigid aftertreatment shell to achieve appropriate gap bulk density (GBD) targets required for element retention.

Despite existing technology, there remains a challenge to bring to production and to improve upon catalyst devices such as closed coupled catalysts, in terms of acceptable reliability and durability, and while capably taking advantage of spin forming production techniques.

SUMMARY

An improved catalytic device and method for producing the same are described that can be used in, for example heavy duty diesel engines. A catalytic device that is spin formed is generally described, where a mat is disposed between a shell of the catalyst device and its catalyst substrate during the forming process.

One inventive concept of the disclosure herein is the use of the mat, so that spin forming can be employed to form a catalyst device. Sealing can be achieved with a decreased reliance on catalyst substrate geometric certainty, and without the need for first sizing. Such concepts are particularly desirable for the formation of closed coupled catalysts (CCC), which often are being produced in shapes that are not of a conventional circle due to OEM space constraints, for example a generally elliptical component other than a circle shape.

In one embodiment, a method of spin forming a catalytic device includes disposing a mat about an outer surface of a catalyst substrate. The catalyst substrate and the mat are inserted inside a shell, where the mat is between the shell and the catalyst substrate. The shell, catalyst substrate, and mat are spin formed.

In some embodiments, the shell, catalyst substrate, and mat are spin formed into at least a generally elliptical shape but generally other than a circle shape.

In one embodiment, a catalytic device includes a shell having an inlet and an outlet that are in fluid communication with an opening extending through the shell. The shell is a spin formed member. A catalyst substrate is disposed within the opening and between the inlet and outlet. The catalyst substrate includes a flow through structure in fluid communication with the inlet and outlet and surrounded by an outer surface. A mat is disposed between the outer surface of the catalyst substrate and the inner surface of the shell, where the catalyst substrate and mat are disposed within the opening of the shell and between the inlet and outlet when the shell is spin formed.

In some embodiments, the shell is a spin formed member that is at least generally elliptically shaped but generally less than a circle shape.

The combination of a mat covering the catalyst substrate during the spin forming process can provide for a robust and flexible solution in the formation of catalyst devices, such as those for use in tighter or lower clearance spaces (i.e. CCC). For example, the disclosure herein can provide a low cost option for producing a highly durable closed coupled catalyst, which can potentially reduce the peak stresses during manufacturing and assembly to ensure adequate substrate retention. The disclosure herein can also potentially eliminate or at least reduce cold working of the catalyst substrate mantle such as in metallic substrates. Also, a low cost option can be enjoyed where the catalyst substrate is effectively captured within the packaging (shell) using the spin formation process. Such a structure can avoid or minimize deformation of the catalyst substrate in general and/or its mantle.

The inventive concepts herein also can provide improved sealing properties with the use of the mat than would a direct metal to metal seal between the catalyst substrate and shell alone. As a result, less gas and blowby material leak past the catalyst substrate. Sound attenuation capability can be achieved with the presence of the mat, versus previous direct metal to metal contact between the mantle of the catalyst substrate and the packaging material (shell).

DETAILED DESCRIPTION

Figure 1:
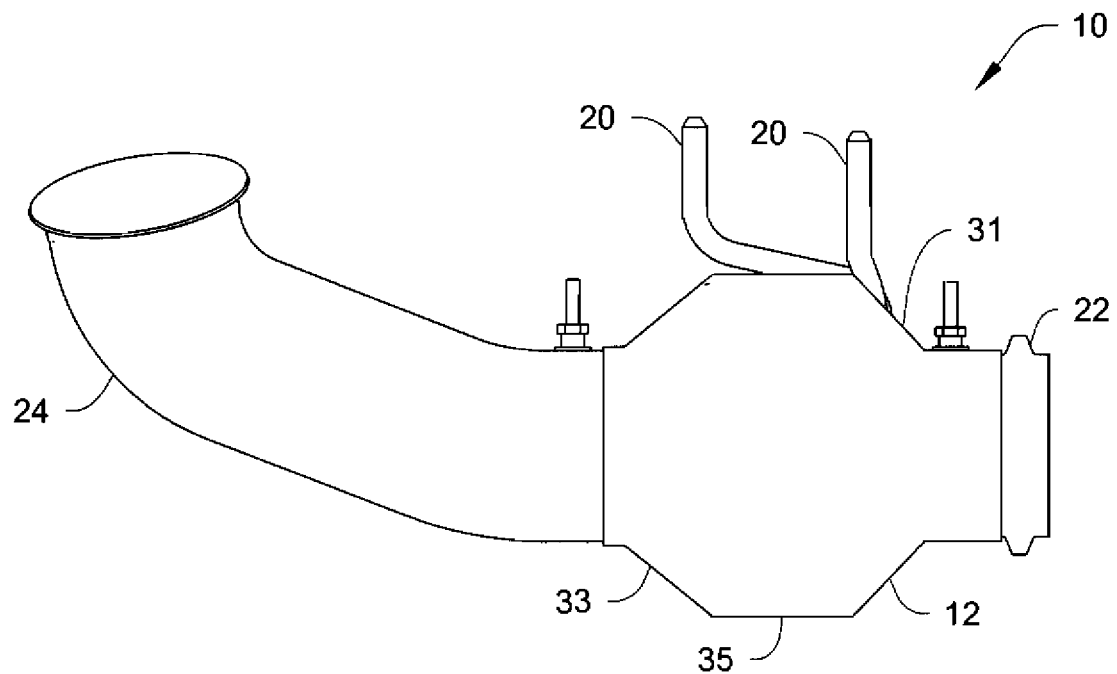
FIG. 1 shows a side view of one embodiment of a catalytic device.

FIGS. 1-4 illustrate a catalytic device 10 that can be used in, for example emissions systems of heavy duty diesel engines. Generally, the catalytic device 10 is spin formed where a mat is disposed between a shell of the catalyst device and its catalyst substrate during the spin forming process.

The methods and devices described herein can be applicable to spin formed catalysts of both circle and non-circle shapes (e.g. elliptical shape or shapes other than a circle). While the description herein sometimes refers to shapes other than a circle, the shape of the catalyst device is not meant to be limiting and can be made as any shape that can be spin formed to accommodate original equipment manufacturer OEM space constraints. It also will be appreciated that while the descriptions refer to closed coupled catalysts, the descriptions herein can be applicable to catalytic devices other than closed coupled catalysts.

As one particular example, the catalytic device 10 shown herein is a closed coupled catalyst produced with a shape that can be generally elliptical or of another complex geometry that is not a circle. The catalytic device 10 includes a shell 12 having an inlet 11 and an outlet 13. The inlet 11 is in fluid communication with the outlet 13 through an opening 15 extending through the shell 12. The shell 12 is a spin formed member. As shown, the shell 12 is at least generally elliptically shaped but generally other than a circle shape, and which will further be discussed below.

A catalyst substrate 14 is disposed within the opening 15 and between the inlet 11 and outlet 13. The catalyst substrate 14 includes a flow through structure in fluid communication with the inlet 11 and outlet 13. The flow through structure can have a plurality of flow channels and take on various configurations, for example a honeycomb configuration or various channeled foil configurations, which are well known in the catalyst substrate art. In some embodiments, the catalyst substrate 14 includes a catalyst coating disposed on surfaces in fluid communication with the inlet 11 and outlet 13. Catalyst coatings are well known for facilitating treatment of exhaust material and need not be further described.

As shown, the catalyst substrate 14 has an outer surface 18 surrounding the flow through structure and that faces an inner surface of the shell 12. A mat 16 is disposed between the outer surface 18 of the catalyst substrate 14 and the inner surface of the shell 12. Preferably, the mat substantially surrounds the outer surface 18 of the catalyst substrate 14. As shown, the catalyst substrate 14 and mat 16 are disposed within the opening 15 of the shell 12 and between the inlet 11 and outlet 13. The catalyst substrate 14 and mat 16 are inserted into the shell 12 and the entire assembly is spin formed to the desired shape.

In some embodiments, the mat 16 is at least one of a ceramic and a metallic material, for example stainless wool or various ceramics. It will be appreciated that the material for the mat 16 is not meant to be limiting. The mat 16 can be any relatively compliant material or layer as compared to the more rigid shell 12 and catalyst substrate 14. The mat 16 also is any material that can withstand a high level of mechanical and thermal stress, such as vibration at 75 g or higher and high temperature exhaust gases. In some examples, the mat 16 can have a thickness of approximately 12-20 mm before spin formation and a compressed thickness of about 5-10 mm after spin formation. It will be appreciated that the thickness of the mat 16 may vary as desired and/or necessary. Generally, the mat 16 acts similar to a pad between the catalyst substrate 14 and the shell 12, and as a gasket to help seal the joint between the catalyst substrate 14 and the shell 12.

As described, one preferred design of the catalytic device 10 is spin formed into at least a generally elliptical shape but generally other than a circle shape. During formation, the mat 16 is sealed between the outer surface 18 of the catalyst substrate 14 and the inner surface of the shell 14. The outer surface 18 can be a mantle, where the mat 16 is directly pressed against the mantle and the inner surface of the shell 12 during spin formation. Generally, the mat 16 is pressed between the shell 12 and the catalyst substrate 14 during this sizing operation. That is, the shell 12, which can be a metallic shell, is squeezed down on the mat 16 and catalyst substrate 14 to attain necessary gap bulk density GBD requirements. In some cases, the mat 16 can be compressed, where the size of the catalyst substrate 14 is fixed. For example, an uncompressed mat is wrapped around the substrate and then compressed during spin formation to reach appropriate GBD requirements. In other embodiments, the mantle of the catalyst substrate 14 also can be formed or bent over to mechanically lock and seal the catalyst substrate 14 in place (see e.g. FIG. 4).

Figure 4:
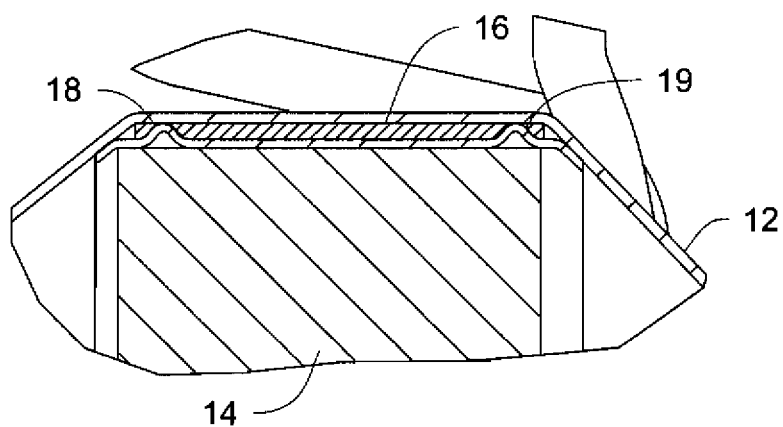
FIG. 4 is a partial sectional view of the catalytic device taken from FIG. 3.

As also shown in FIG. 4, the mantle can include at least one retention barb 19 in direct contact with the mat 16. The retention barb 19 can further help mechanically retain the mat 16 between the catalyst substrate 14 and the shell 12. The mantle also may employ other structures such as end rings or diameter reducers that reduce the shell to mechanically retain the mat 16 between the catalyst substrate 14 and the shell 12. However, it will be appreciated that the retention barb 19 shown is merely exemplary. Other implementations may not include a retention barb 19 at all. For example, the mat 16 can be suitably retained and sealed between the shell 12 and the catalyst substrate 14 by spin formation alone.

Figure 2:
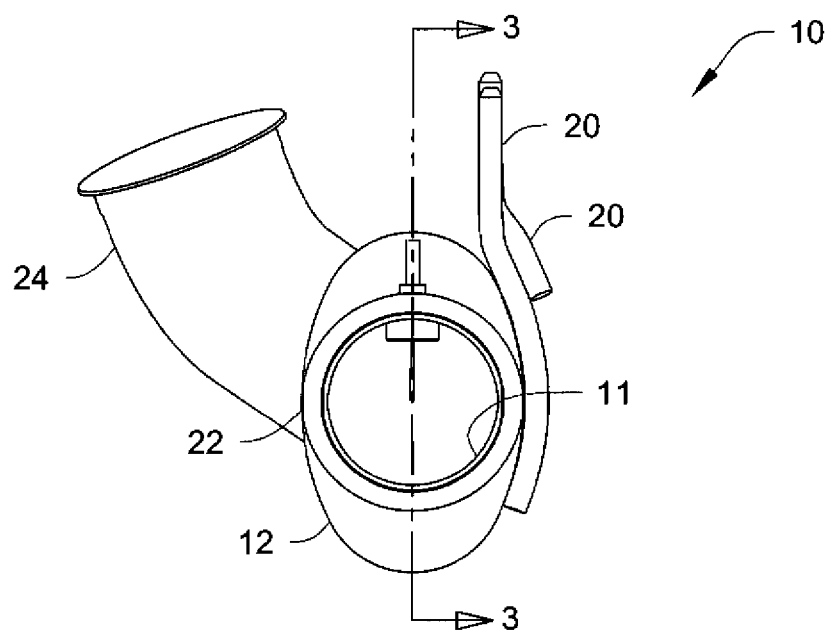
FIG. 2 shows an end view of the catalytic device of FIG. 1.
Figure 3:
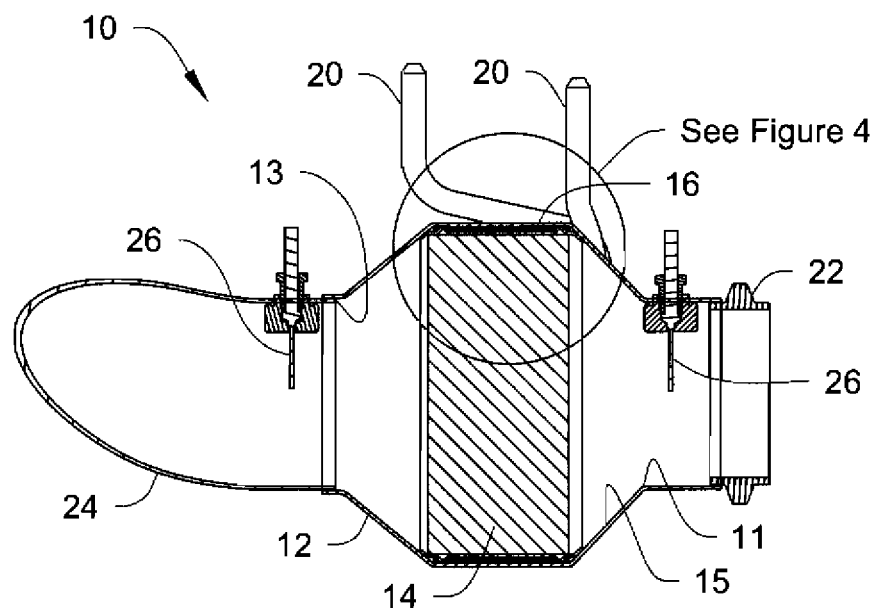
FIG. 3 is a sectional view of the catalytic device from line 3-3 of FIG. 2.

When the catalytic device 10 has been formed, FIGS. 1 and 3 show that the shell 12 includes a spin formed outer surface having portions 31, 33 proximate the inlet 11 and outlet 13 and a portion 35 between the portions 31, 33 proximate the inlet 11 and outlet 13. The portions 31, 33 proximate the inlet 11 and outlet 13 have a smaller dimension than the portion 35 between the inlet 11 and outlet 13, for example, after being spin formed into an oval like shape (see FIG. 2).

As described the catalytic device 10 is spin formed, where the mat 16 is between the catalyst substrate 14 and the shell 12. Known spin forming manufacturing processes may be employed. In one embodiment, a catalytic device as described herein is produced by first disposing a mat about an outer surface of a catalyst substrate. The catalyst substrate and mat are inserted inside a shell, such that the mat is between the shell and the catalyst substrate. The shell, catalyst substrate, and mat are then spin formed. In some embodiments, the step of spin forming also includes sealing the mat between the shell and the catalyst substrate. In yet other embodiments, the step of spin forming includes directly contacting the mat with an outer surface of the catalyst substrate and with an inner surface of the shell.

Taking the example shown in FIGS. 1-4, the step of spin forming can further include forming an outer surface of the shell 12 with portions 31, 33 proximate the inlet 11, and outlet 13 and a portion 35 between the portions 31, 33. The portions 31, 33 proximate the inlet 11 and outlet 13 are spin formed with a smaller dimension than the portion 31, 33 between the inlet 11 and outlet 13.

The catalytic device 10 can be mounted as part of a greater exhaust system through various connections, couplings, mounts, etc. FIGS. 1-3 show one example of a mount configuration that would allow the catalytic device 10 to be mounted to the greater exhaust system. Couplers 22, 24 respectively are attached to the shell 12. The couplers 22, 24 are tubes or conduits that place the inlet 11, outlet 13, and catalyst substrate 14 in fluid communication with the greater exhaust system. As further shown, mounts 20 are disposed on a side of the shell 12. As one example, the mounts 20 can be rigidly attached to the shell 12. The mounts 20 allow for the catalytic device 10 to be connected to an engine that the device 10 is intended to be used in.

Temperature measurement components 26, such as a thermocouple or thermoster, are disposed within the flow path created by the catalytic device 10 and couplers 22, 24. In FIGS. 2-3, one example is shown where one temperature measurement component 26 is connected on the shell 12 and proximate inlet 11 and one temperature measurement component 26 is connected on the coupler 24 and proximate the outlet 13. The temperature measurement components 26 help monitor exhaust temperature on both the inlet and outlet sides of the catalytic device 10. As shown, the temperature measurement components 26 may be connected using a nut and bolt connection. It will be appreciated that the manner in which the temperature measurement components 26 are connected and their location is meant to be non-limiting and can be suitably modified as desired and/or necessary. It also will be appreciated that other sensors may be employed, such as sensors for pressure, soot, oxygen, and $NO_x$.

In general, the disclosure herein provides for cold forming spin technology to be combined with catalytic element packaging in forming the shell around the catalytic substrate, where a mat is disposed between the catalyst substrate and the shell during the formation process. Among other benefits, the devices and methods disclosed herein can increase catalyst substrate retention inside the shell, increase or at least maintain catalytic conversion efficiencies and fuel economy, and increase catalyst substrate and overall device durability. Furthermore, the devices and methods herein can decrease thermal losses and noise vibration and harshness (NVH).

As described, the combination of a mat covering the catalyst substrate during the spin forming process can provide for a robust and flexible solution in the formation of catalyst devices, such as those for use in tighter or lower clearance spaces (i.e. CCC). For example, the disclosure herein can provide a low cost option for producing a highly durable closed coupled catalyst, which can potentially reduce the peak stresses during manufacturing and assembly to ensure adequate substrate retention. For example, the disclosure herein can eliminate cracking in ceramic substrates, but also potentially eliminate or at least reduce cold working of the mantle such as when metallic substrates are used. Also, a low cost option can be enjoyed where the catalyst substrate is effectively captured within the packaging (shell) using the spin formation process. Such a structure can avoid or minimize deformation of the catalyst substrate in general and/or its mantle.

As a result, the inventive concepts herein can provide for a catalyst device that can be made with a shape to accommodate special OEM space constraints, which can be applicable to, for example, high volume, small sized catalysts. The disclosure herein applies to closed coupled catalysts and can also apply to other catalysts devices such as DOC, SCR, DPF catalysts.

The devices and methods described herein also allow for a catalyst device that can readily be joined with the greater exhaust system through an integrally formed one piece shell, which eliminates multiple components and multiple joints. The inventive concepts herein can provide for easier and cheaper assembly of a catalyst device, which is less prone to leakage in service, and is smaller and lighter. The descriptions herein can provide for overall easier engine production.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A catalytic device comprising:
   a shell having an inlet and an outlet, the inlet is in fluid communication with the outlet through an opening extending through the shell;
   a catalyst substrate disposed within the opening and between the inlet and outlet, the catalyst substrate including a flow through structure in fluid communication with the inlet and outlet, the catalyst substrate having an outer surface surrounding the flow through structure and that faces an inner surface of the shell, wherein a first end of the outer surface is bent over toward the flow through structure, so as to mechanically lock and seal the catalyst substrate in place;
   a mat disposed between the outer surface of the catalyst substrate and the inner surface of the shell such that the mat is directly pressed against and sealed between the outer surface of the catalyst substrate and the inner surface of the shell; and
   the outer surface having at least one retention barb in direct contact with the mat, the shell is a spin formed member where the catalyst substrate and mat are disposed within the opening of the shell and between the inlet and outlet when the shell is spin formed.

2. The device of claim 1, wherein the shell is a spin formed member that is at least generally elliptically shaped but other than a circle shape.

3. The device of claim 1, wherein the mat is at least one of a ceramic and a metallic material.

4. The device of claim 1, wherein the mat is substantially disposed about the outer surface of the catalyst substrate.

5. The device of claim 1, wherein the catalyst substrate includes a catalyst coating disposed on surfaces in fluid communication with the inlet and outlet.

6. The device of claim 1, wherein the shell includes a spin formed outer surface having portions proximate the inlet and outlet and a portion between the portions proximate the inlet and outlet, the portions proximate the inlet and outlet have a smaller dimension than the portion between the inlet and outlet.

7. The device of claim 1, wherein a second end of the outer surface is bent over toward the flow through structure.

8. A catalytic device comprising:
a shell having an inlet and an outlet, the inlet is in fluid communication with the outlet through an opening extending through the shell;
a catalyst substrate disposed within the opening and between the inlet and outlet, the catalyst substrate including a flow through structure in fluid communication with the inlet and outlet, the catalyst substrate having an outer surface surrounding the flow through structure and that faces an inner surface of the shell; and
a mat disposed between the outer surface of the catalyst substrate and the inner surface of the shell such that the mat is directly pressed against the outer surface of the catalyst substrate and the inner surface of the shell, the outer surface of the catalyst substrate including at least one retention barb in direct contact with the mat;
the shell is a spin formed member where the catalyst substrate and mat are disposed within the opening of the shell and between the inlet and outlet when the shell is spin formed.

9. The device of claim 8, wherein the retention barb mechanically retains the mat between the catalyst substrate and a middle portion of the shell, and the middle portion of the shell extends towards ends of the catalyst substrate and is planar.

* * * * *